2,698,836

STABILIZED ORGANIC SILICATES IN HEAT TRANSFER PROCESS

Jacque C. Morrell, Merion, Pa.

No Drawing. Application May 17, 1948,
Serial No. 27,601

3 Claims. (Cl. 252—78)

This invention relates to the use of high boiling liquids as a heat transfer medium or source of sensible heat, and pertains more particularly to the use of organic silicates, especially the alkyl and aryl, e. g., the tetra-aryl ortho silicates for such purposes.

The heat given up by a liquid in cooling from its initial to its final temperature, i. e., sensible heat, is often used as a source of energy. This is accomplished by heating the heat transfer medium and recirculating the same usually in tubes to the point of application where the heat content is removed, returning the heating medium to be reheated and continuing the process. In the past, various high boiling liquids, such as heavy oils, mercury, molten salts and molten metals, and several outstanding organic compounds, e. g., diphenyl oxide or mixtures of the same have been employed for this purpose. Each of these has some objections which must be overcome in their application.

More recently, the organic silicates, e. g., the tetra-aryl ortho silicates and similar compounds or mixtures thereof, have been proposed as a heat transfer medium, e. g., of the class disclosed by Johnston U. S. Patent 2,335,012 and have been found highly satisfactory for this purpose in most respects as well as for other industrial uses. For example, they remain liquid over a wide temperature range at atmospheric pressure and may be raised above the boiling point, and the vapors as well may be used in the heat transfer processes.

As disclosed by the Johnston patent only the derivatives of the monohydric phenols are included for the reasons stated below. These may be the reaction product of silicon tetrachloride and unsubstituted phenol itself or have one or more substitutents which are nonreactive towards silicon tetrachloride e. g. methyl groups (the cresols) or other alkyl groups, ether groups (the guaiacols, etc.) or other groups which may form an additional ring or rings (the naphthols, etc.). Therefore the organic silicates used are made by the following broad reaction:

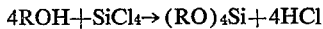

$$4ROH + SiCl_4 \rightarrow (RO)_4Si + 4HCl$$

Among the substances which have been employed are the tetra-aryl ortho silicates, typical of the reaction between silicon tetra-chloride and phenols whose only reactive group with respect to the silicon tetra-chloride is a single —OH group. Among specific organic silicate compounds are tetra-phenyl ortho silicate with boiling point about 770° F. and melting point 118° F. and specific heat about 0.55 at 300° F. Other compounds are tetra-cresyl ortho silicate, also with advantageous properties, or mixtures of the same. Tetra-alkyl ortho silicates, such as ethyl and others may also be used either alone or in admixture. These are shown by way of example.

It has been found, however, that these organic silicates are susceptible to hydrolysis, especially in open systems when exposed to water and/or steam and that this causes the formation of silicic acid which is a gel-like substance and which proves very annoying by clogging the circulating tubes and other parts of the system to the extent of vitiating the entire operation. It is among the objects of this invention to minimize or eliminate this difficulty.

In carrying out the objects of this invention, I make use of various substances having, in general, an alkaline reaction themselves, but which in any event are alkaline under the conditions which prevail to cause the hydrolysis of organic silicates and which prevent or minimize the latter reaction with its concomitant difficulties. In general, I utilize such substances preferably dissolved in the organic silicate heat transfer medium which suppress or neutralize the formation of hydrogen ions or of the acidic products generally, which cause the hydrolysis of the organic silicates to cause formation and/or precipitation of silicic acid. Obviously no water should be added to the organic silicates.

The types of compounds with alkaline properties which may be employed in connection with my invention, cover a wide range, including both organic, e. g., the organic bases, and inorganic, e. g., ammonium compounds and mixed compounds, e. g., the soluble organic bases, and in general, the salts of weak acids and strong bases. Those which are soluble or miscible with the organic silicates are preferred. Among the groups which may be employed are the amines sometimes referred to as the substituted ammonias in which one or more atoms of hydrogen are substituted by alkyl groups, and the corresponding aryl substituted ammonias, i. e., the aromatic amines and mixed substitutents. These include the primary, secondary and tertiary compounds, depending on the number of hydrogen atoms replaced in the amines. Other properties are, of course, important in connection with the present invention, e. g., solubility of the amine in the organic silicate and boiling point. With regard to the latter, the greater the number and the larger the substituent group, such as alkyl, etc., the higher the boiling point, e. g., the heptadecylamine boils at 644° F. and the tri-n-octylamine at 695° F. Compounds which hydrolyze to form amines under the conditions of use may also be employed.

Among the most desirable of the compounds to be employed are the amino phenols, including those in which the remaining hydrogens in the amine group are substituted by alkyl radicals, e. g., ethyl, propyl, butyl, etc.; also the homologues and in some cases the di and tri hydric amino phenols. Mixtures of amines and aminophenols, as well as of the other compounds referred to below may be used where compatible.

The quaternary ammonium compounds and the corresponding bases, e. g., $RNH_3$—OH, $R_4$—N—OH may also be employed, the more the number of alkyls, the greater the solubility. The hydroxylamines, such as the alkyl and phenyl hydroxylamines, and the alkamines, i. e., those containing the hydroxyl and amino groups, such as the mono, di and tri ethanolamines and particularly the higher molecular weight, and homologues, as well as the diamines, triamines and tetramines may also be employed.

Compounds as morpholine, which combine the properties of a cyclic ether and a secondary amine may be used in connection with my invention.

Another group in connection with my invention are the heterocyclic compounds, i. e., for example, those in which there are five or six atoms in the ring, at least one of which is nitrogen and which may comprise more than one ring. Among examples of these, mentioned as types only, are pyrazole, triazole, etc. (five membered) pyridine and its homologues, picolines, utidines, collidines, quinoline, etc. (six membered), acridine, multi-ring compounds, carbozole, yrrole, pyrazole, the alkaloid bases, etc.

In addition to the basic organic compounds mentioned above, I contemplate employing various salts comprising particularly those of the alkali metals, e. g., the salts of ammonium, sodium and potassium and organic acids, such as, for example, the oleates, linoleates, palmitates, acetates and their homologues and salts of dibasic organic acids and the like, particularly those where the said salts are soluble in the organic silicates and which are basic on hydrolysis.

Where the organic silicates are used in a closed system as a heat transfer medium, ammonia may be employed per se by dissolving the gas in the organic silicate.

Many other types of organic compounds, particularly those containing nitrogen, exhibit basic properties and may be used in the present invention. The reactions of these compounds are due to the basic properties of the nitrogen atom, i. e., its ability to combine with the hydrogen ion. This is particularly true of the amines and substituted amines, both alkyl and aryl, the amino phenols and other large groups of compounds and substances which fall within the scope of my invention.

It is also contemplated, in connection with the present invention, utilizing compounds comprising organic silicates, e. g., tetra-phenyl ortho silicate wherein the phenyl group or corresponding aryl group contains an amino or substituted amino group in the molecule.

Certain nitrogen compounds, e. g., of the azo, hydrazo, hydrazone type, which are somewhat unstable, and those which combine acidic and basic properties such as the amino acids and amides may find limited use in connection with the present invention either alone or in combination.

In carrying out the invention, from a fraction of a percent to ten percent more or less of the basic material is added to the organic silicate and the latter employed as a heat transfer medium in the same manner as in the absence of the basic material, except that it is much more resistant to hydrolysis and can be used more freely in open systems than the organic silicates alone.

Many other examples than those given may be shown but it is believed that sufficient have been cited to illustrate the invention, all of the examples falling within the large class having basic or alkaline properties and which may be defined and referred to here as a base, i. e., a substance which is basic and which combines with or neutralizes acids or hydrogen ions generally or represses their formation under conditions which favor hydrolysis of the organic silicates and thereby prevents formation of silicic acid. Preferably the base is soluble in the organic silicate.

The examples shown are illustrative and are not to be construed as limiting the broad scope and spirit of the invention.

I claim as my invention:

1. In a process wherein a tetra-aryl ortho silicate is employed as a heat transfer medium, the improvement which comprises the step of employing the said tetraaryl-ortho silicate to which has been added a minor amount not to exceed ten percent of a basic organic material to minimize hydrolysis and the formation of silicic acid in the said tetra-aryl ortho silicate.

2. In a process wherein a tetra phenyl ortho silicate is employed as a heat transfer medium, the improvement which comprises the step of employing the said tetra phenyl ortho silicate to which has been added a minor amount not to exceed ten per cent of a basic organic material to minimize hydrolysis and the formation of silicic acid in the said tetra phenyl ortho silicate.

3. In a process wherein a tetra cresyl ortho silicate is employed as a heat transfer medium, the improvement which comprises the step of employing the said tetra cresyl ortho silicate to which has been added a minor amount not to exceed ten percent of a basic organic material to minimize hydrolysis and the formation of silicic acid in the said organic silicate.

References Cited in the file of this patent

UNITED STATES PATENTS

| Number | Name | Date |
|---|---|---|
| 2,058,844 | Vaughn | Oct. 27, 1936 |
| 2,114,866 | Vaughn | Apr. 19, 1938 |
| 2,265,962 | Bent et al. | Dec. 9, 1941 |
| 2,335,012 | Johnston | Nov. 23, 1943 |
| 2,349,338 | Clapsadle et al. | May 23, 1944 |
| 2,550,923 | Hackford et al. | May 1, 1951 |